Figure 6:
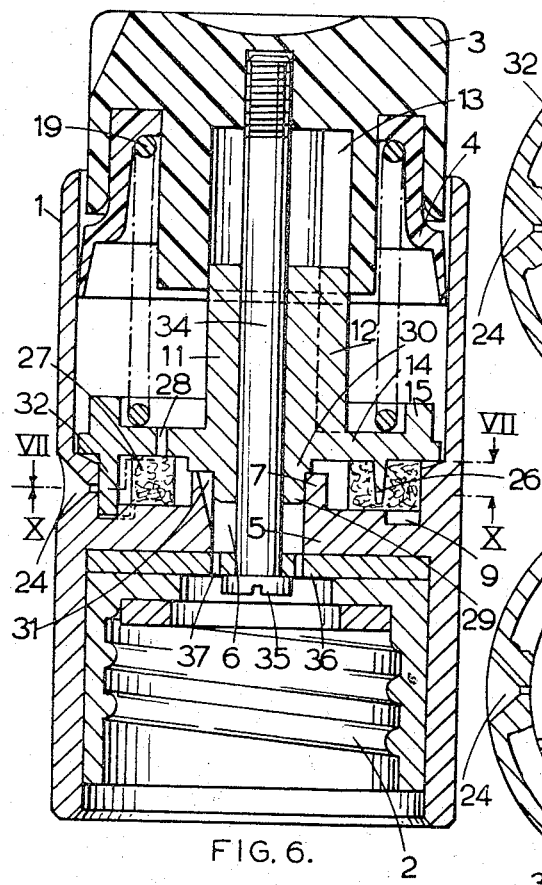

Aug. 22, 1967   G. KIASHEK   3,337,137
SCENT SPRAYS HAVING A VARIABLE QUANTITY ADJUSTMENT
Filed April 16, 1965   2 Sheets-Sheet 1
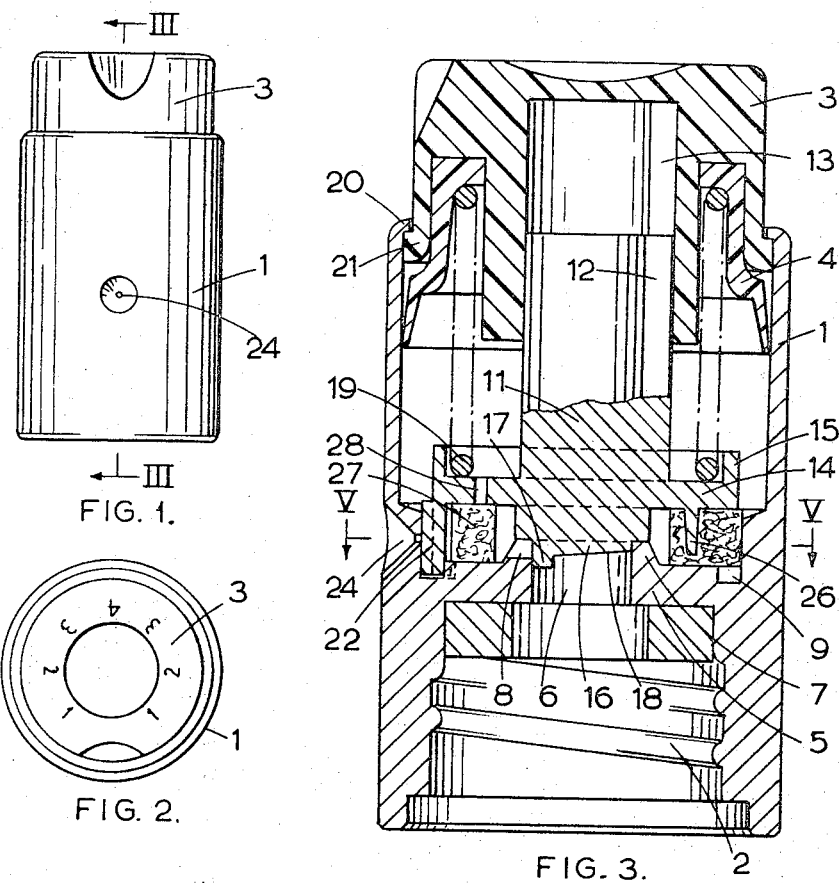
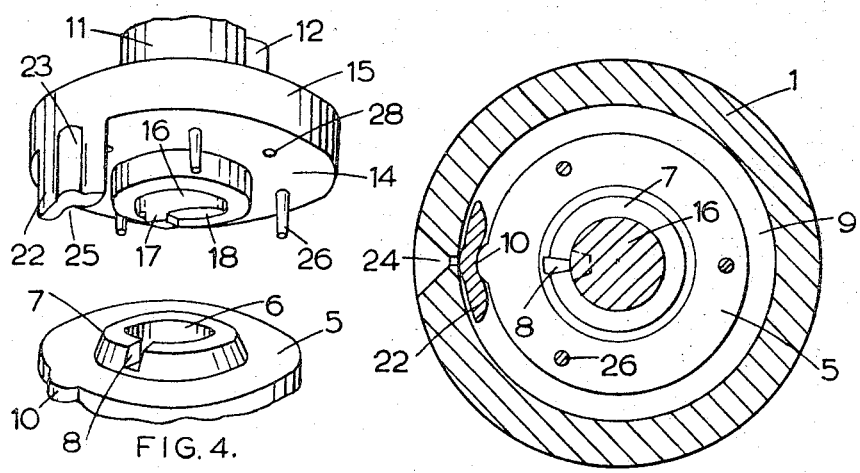
INVENTOR:
GEORGE KIASHEK
By E. M. Squire
HIS ATTY.

Aug. 22, 1967   G. KIASHEK   3,337,137
SCENT SPRAYS HAVING A VARIABLE QUANTITY ADJUSTMENT
Filed April 16, 1965   2 Sheets-Sheet 2

INVENTOR:
GEORGE KIASHEK
By E.M. Squire
HIS ATTY.

United States Patent Office 3,337,137
Patented Aug. 22, 1967

3,337,137
SCENT SPRAYS HAVING A VARIABLE QUANTITY ADJUSTMENT
George Kiashek, 9 W. Heath Ave.,
London, NW. 11, England
Filed Apr. 16, 1965, Ser. No. 448,666
Claims priority, application Great Britain, Apr. 20, 1964, 16,239/64
8 Claims. (Cl. 239—326)

This invention relates to scent sprays, which are adapted to be connected to the neck of a bottle or like container of scent or which have a hollow body portion as container of the scent, of the kind having an externally operable plunger acting on a spring-loaded piston in a cylinder and movable by the user to cause a spray of scent to be discharged from the sprayer after inversion and operation of the plunger.

Hitherto such scent sprays have relied on a valve to shut off the scent container, whatever its form, from the cylinder of the sprayer and the quantity of scent sprayed out is that which passes the valve while it is unseated and the device is inverted to allow scent to pass the unseated valve, which amount has been a substantially constant quantity due to limitation of the rate of flow or the provision of a secondary valve which closes shortly after the shutoff valve opens.

Experience has shown that the more satisfactory way of regulating the quantity of scent to be sprayed out is by limiting the flow of scent from the container into the sprayer but, due to the small area of passage which is then necessary and gummy substance commonly present in scent, such passage may become blocked and it can easily become choked by dirt.

Now the object of the present invention is to provide an improved spray having the advantages of such controlled flow of scent with reduced risk of blockage in an arrangement in which the quantity of scent sprayed out at each operation of the plunger may be varied by the user.

In the spray according to the present invention the flow of scent from the container to the sprayer is through a port the area of opening of which is variable between nil and full open by the edge or face surface of a part rotatable relative to a stationary part having such port and movable by the plunger independently of its axial displacement.

In one position of the rotatable part the area of the port is obstructed so that there is no possible flow of scent and in other positions thereof the port is progressively opened between minimum and maximum. Should the port become blocked at minimum opening, it may be fully opened and flushed out by the resultant flow of scent.

The device, may, in accordance with a further feature of the invention, have a part for closing the discharge orifice and also movable with the rotatable part such that movement of that part to open the port also opens the discharge orifice. Thus the rotatable part serves to isolate the scent container from the cylinder of the sprayer when the device is not in use and the discharge orifice obturator closes the same to prevent escape of any scent which may have impregnated the pad commonly provided in such sprays. Provision may be made for causing rotation of such pad with the rotatable part.

As is usual with sprays of the kind in question the user applies pressure to a protruding plunger, which may form part of the piston of the sprayer, to operate the device to spray out scent. In the new device the plunger is made rotatable and adapted by its rotation the part rotatable relative to the part having the port, as by such parts directly engaging telescopically for relatively linear movement and having surfaces for ensuring their common rotation.

Suitable marks may be provided on the protruding plunger and on the adjacent portion of the casing so that the user may know the rotational position of the plunger, i.e. its position in which the port or passage closed (and if appropriate the outlet orifice also closed), its position to give spray, and also its position for maximum spray.

The plunger may be fully rotational so as to be movable through approximately 180° between port shut and maximum open positions, in which case it is preferred to provide means which will click when the rotatable part reaches port closed position. The part causing such click may be the part which closes the discharge orifice acting in conjunction with a projection on the stationary part.

In an alternative embodiment, the extent of movement of the rotatable part is limited when the arrangement is such that in limit position, after turning in either direction, the port is closed. This limitation of rotation is conveniently effected by arranging that the part which closes the discharge orifice has an abutment which cooperates with the an abutment of the stationary part.

Outward movement of the plunger under the action of its loading spring is limited as by an inturned end edge of the cylinder cooperating with a peripheral flange of such plunger or by the provision of a headed bolt, the head of which may engage a movement limiting part and which engages with the plunger.

Figure 7:
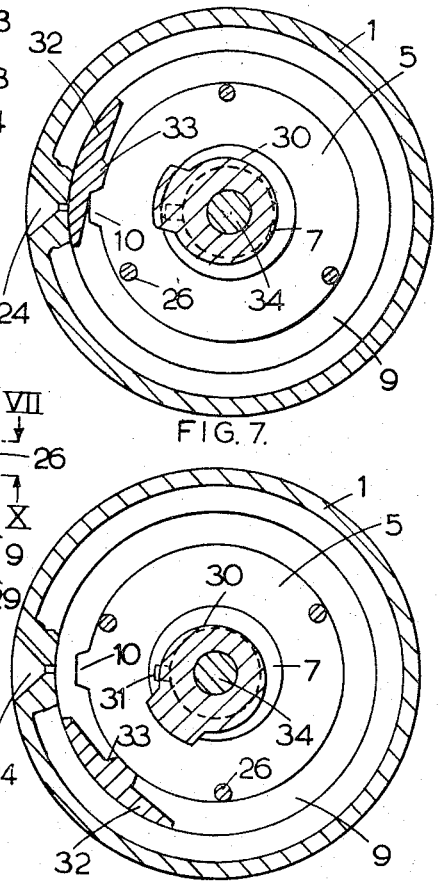
Figure 8:
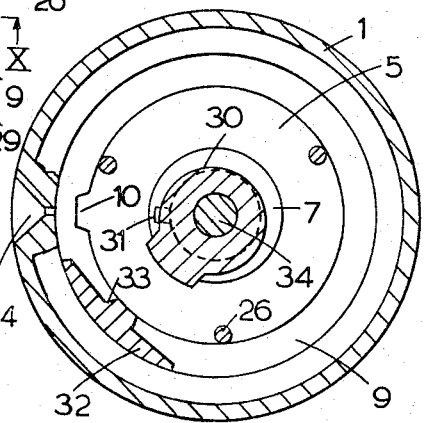
Figure 10:
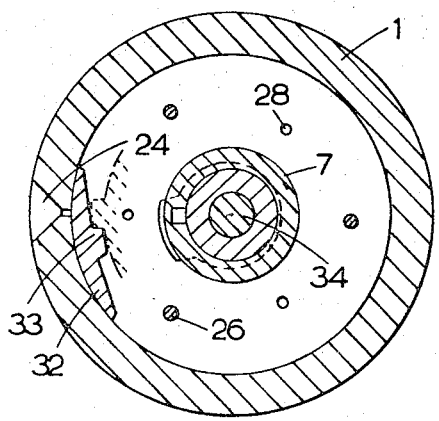
Figure 9:
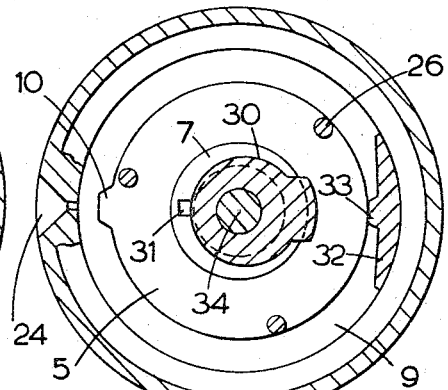

In order that the invention may be clearly understood embodiments thereof are by way of example hereinafter more fully described and illustrated in the accompanying drawings, in which:

FIG. 1 is an elevation,
FIG. 2 is a plan view looking down on FIG. 1,
FIG. 3 is an enlarged sectional view on the line III—III of FIG. 1,
FIG. 4 is an exploded perspective view of the rotatable and stationary parts of the spray,
FIG. 5 is a cross section on the line V—V of FIG. 3.
FIG. 6 is a view similar to FIG. 3 showing a modified construction,
FIGS. 7, 8 and 9 are cross sectional views on the line VII—VII of FIG. 6 showing the rotatable member in different positions, and
FIG. 10 is a cross section on the line X—X of FIG. 6.

Referring now to the said drawings and in particular to FIGS. 1 to 5 thereof, the sprayer comprises at tubular body 1, which may comprise a plastic moulding with a metallic outer skin. The body 1 may be extended to form a container for scent closed off by its own stopper and as shown is at one end internally threaded at 2 to screw onto the neck of a bottle or other container (not shown) of scent. The other end of the body 1 forms a cylinder containing a piston formed by the plunger 3 and cup washer 4. A transverse partition 5 with a central bore 6 separates the upper cylinder and lower end portions of the body 1.

The partition 5 being fast with the body 1 constitutes the part previously referred to and has an upstanding annular flange 7 around the bore 6. A slot 8 in such flange 7 forms a port. An annular peripheral groove 9 (concentric with the bore 6) is formed in the upper surface of the partition 5. On the inner wall of the groove 9 is a protuberance 10 positioned radially outwardly of the port 8.

The plunger 3 is tubular to receive telescopically the stem portion of the rotatable part 11, which stem has an axially extending rib 12 longitudinally slidable in a slot 13 in the plunger to ensure that these two parts will rotate together while permitting axial movement of such plunger. The lower end of the rotatable part 11 has a collar portion 14 with an upwardly directed marginal flange 15. The lower end of the part 11 bears on the flange 7 (see FIG. 3) and has an extension 16 of reduced diameter which works in the bore 6 including an axial extension 17 long enough to mask the port 8 and a helically sloping surface 18 which will progressively vary the effective area of the port opening as the part 11 is rotated through some 180° to a position in which the port 8 is fully open.

A spring 19 is located between the collar portion 14 and the plunger 3, the escape of plunger 3 from the body 1 under the action of such spring being prevented, in the embodiment as illustrated, by the inturned edge 20 of the body 1 cooperating with a peripheral flange 21 of the plunger.

The rotatable part 11 is conveniently a moulding of plastic material and its collar portion 14 has a depending leg portion 22, extending downwardly from flange 15, the free end of which moves in the groove 9. The leg portion 22 has an external rib 23 which closes the discharge orifice 24 in the wall of the body 1 when the rotatable part 11 is in the position in which the part 17 closes the port 8 (i.e. as in FIGS. 3 and 5). The leg portion 22 also has an internal groove 25 in which, in closed position, engages the protuberance 10. Being made of plastic, and hence elastic, material the leg portion 22 will rock or flex when the portions thereof beyond the groove 25 engage the protuberance, whereby the groove 25 tends to hold the rotatable part 11 in its port closed position.

The space between the collar portion 14 and partition 5 is filled with a ring of wadding, sponge, sponge rubber or other absorbent material 27, and the collar portion 14 is provided with a plurality of downwardly extending projections 26 which penetrate into the ring of absorbent material 27 and cause the same to rotate with the rotatable part 11. Vent bores 28 are provided in the collar portion 14 so that any scent which may have entered the cylinder may drain into the absorbent material.

In use, the projecting portion of the plunger 3 is turned from port closed position to give fine, medium or heavy spray as indicated by the numerals on the end of the plunger. The sprayer is inverted so that scent can flow through the open port 8 to impregnate the ring 27 of absorbent material and the plunger is reciprocated by digital pressure on the end thereof to force air and atomised scent in and out through the discharge orifice.

In the foregoing embodiment it is the edge of the helically sloping surface 18 which varies the area of the port 8 but equally well the face of a corresponding portion could constitute the flow regulator and such an embodiment is illustrated in FIGS. 6–10 in which like parts to those in FIGS. 1–5 are identified by like reference numerals and are not again described.

The rotatable part 11 has a portion 30 eccentric to the rotational axis thereof which bears on the flange 7 for progressively uncovering the port therein formed by a slot or groove 31 in the wall of the bore 6, and below eccentric portion 30 is a cylindrical portion 29 which works in the bore 6.

FIGS. 6–10 also show another alternative in that instead of the leg portion 22, there is a leg portion 32 with a curved outer surface and an inner abutment 33 which cannot pass the protuberance 10 which thereby limits the extent of rotation of the rotatable part 11. At the end of its rotation in either direction of movement, the curved outer surface of the portion 32 closes the discharge orifice 24, i.e. as shown in FIGS. 7 and 10. After partial rotation of the part 11, i.e. as shown in FIG. 8 the vertical groove or port 31 is partly open and the discharge orifice unmasked. After turning through nearly 180°, i.e. to the position shown in FIG. 9 the port 31 is fully open.

In FIG. 6 a further modification is shown in that escape of the plunger 3 is prevented by being engaged by a headed bolt 34, the head 35 of which engages part of the partition 5 or a plate 36 with apertures 37 for the passage of scent. A washer (not shown) could be provided under the head 35 for closing the apertures 37 as an additional shut off measure when the plunger is in its normal fully projecting position.

I claim:
1. A spray device for liquid such as scent to be sprayed, comprising a tubular body with a discharge orifice, a piston movable in said tubular body to spray out said liquid through said orifice, a transverse partition with a central bore in said body, a flange around said central bore, a part rotatable relative to said partition and having a radially extending portion bearing on said flange to form a space between said radially extending portion and said transverse partition, means for rotating said rotatable part with said piston independently of reciprocation thereof, a pad of absorbent material in said space, a spring between said radially extending portion and said piston, means for preventing said piston from moving out of said tubular body, a slot in said flange forming a port, and masking means movable with said rotatable part relative to said port to vary the opening thereof between closed and full open.

2. A spray device for liquid such as scent to be sprayed, comprising a tubular body, a piston reciprocatable and rotatable in said tubular body, a transverse partition having a central bore formed therein, a rotatable part extending into said bore, means for causing rotation of said rotatable part with said piston independently of its reciprocation, a radially extending portion fast with said rotatable part, a spring between said radial portion and said piston, a port in said partition, and means movable with said rotatable part for progressively varying the extent of opening of said port between closed and open.

3. A spray device for liquid such as scent to be sprayed, comprising a tubular body with a discharge orifice therein, a piston movable in said tubular body, a transverse partition with a central bore in said body, said bore being surrounded by an annular flange extending toward said piston, a rotatable part extending into said bore and having a radially extending portion bearing on said flange to form a space between said radial portion and said partition, a pad of absorbent material in said space, a spring between said radial portion and said piston, means for causing said rotatable part to rotate with said piston independently of reciprocation thereof, a port in said partition opening to said space, and means movable with said rotatable part to vary the extent of opening of said port between closed and open, and closure means movable with said rotatable part to close said discharge orifice when said port is closed.

4. A spray device as claimed in claim 3 wherein said closure means comprises a part at the periphery of said radial portion, said part having a rib to close said discharge orifice and a groove which will click with a protuberance projecting from said partition.

5. A spray device as claimed in claim 3 wherein said closure means is formed with an abutment and said partition has a projection co-operating with said abutment to limit the extent of rotation of said rotatable part.

6. A spray device as claimed in claim 3 wherein said radially extending portion has projecting portions penetrating said pad to rotate said pad with said rotatable part.

7. A spray device as claimed in claim 3 wherein said port comprises a slot in the edge of said flange and said means for varying the opening of said port comprise an extension of said rotatable part located in said bore, said extension having a helically sloping portion for progressively closing said port.

8. A spray device as claimed in claim 3 wherein, said port comprises a sloping slot in said central bore and said means for varying the opening of said port comprises a disc portion eccentric to the rotational axis of the rotatable part.

References Cited

UNITED STATES PATENTS

| | | | |
|---|---|---|---|
| 2,853,343 | 9/1958 | Bamberger et al. | 239—349 |
| 2,913,154 | 11/1959 | Kuffer. | |
| 2,974,879 | 3/1961 | Raehs et al. | 239—349 X |
| 3,092,331 | 6/1963 | Kiashek | 239—326 X |
| 3,101,905 | 8/1963 | Hoenig | 239—349 X |
| 3,162,372 | 12/1964 | Viard | 239—354 |
| 3,209,960 | 10/1965 | Green | 239—573 X |

M. HENSON WOOD, JR., *Primary Examiner.*

V. C. WILKS, *Assistant Examiner.*